3,080,329
POLYURETHANE CELLULAR MATERIALS
Charles Minor Barringer, Kennett Township, Chester County, Pa., assignor to E. I. du Pont de Nemours and Company, Wilmington, Del., a corporation of Delaware
No Drawing. Filed July 31, 1958, Ser. No. 752,203
1 Claim. (Cl. 260—2.5)

This invention relates to novel cellular polyurethane materials and more particularly to cellular polyurethane materials which have improved insulation efficiency in that they have halogenated hydrocarbons of low thermal conductivity contained within their closed cells.

Thermal insulation is widely employed today in homes, office buildings, warehouses, mercantile establishments, farms, factories, and the like. The number of potential applications is almost boundless. A wide variety of materials have been used for thermal insulation purposes where the maximum temperature encountered is below 50° C. In recent years foamed plastics made from polystyrene, cellulose acetate, urea-formaldehyde resins, phenolformaldehyde resins, polyvinylchloride, calcium alginate, and polyurethanes have been gaining acceptance. Plastic polyurethane foams are exceptionally well suited for use as thermal insulation. These polyurethane foams have other attractive properties such as excellent adhesion to a wide variety of substrates, high strength in both rigid and semi-rigid state, good impact resistance, flame resistance, and inertness toward many common solvents.

Some of the polyurethane cellular materials which have been previously prepared have been blown by carbon dioxide which is liberated when isocyanato groups react with water. Some of these foams have had a high portion of open cells, whereas others have had a high closed cell content, with these closed cells containing the carbon dioxide. It is known that the efficiency of a cellular material as an insulator depends largely on the thermal conductivity of the gas contained within the cells and that the insulation efficiency of cellular materials is increased when the cells contain a gas having a thermal conductivity lower than that of air or carbon dioxide. One of the problems encountered with polyurethanes, however, has been to provide a cellular material which will retain a gas having a low thermal conductivity over a long period of time. In addition, there is a problem of providing a convenient method whereby such cellular polyurethane materials could be prepared in places having irregular shapes.

It is an object of the present invention to provide novel polyurethane cellular materials having improved insulation efficiency. A further object is to provide a novel polyester polyurethane cellular material suitable for use as an insulation material at low and medium temperatures. A still further object is to provide a cellular polyurethane material which will contain a gas of low thermal conductivity over a long period of time. Another object is to provide a process for the preparation of these cellular polyurethane materials. Other objects will appear hereinafter.

These and other objects of this invention are accomplished by a polyester polyurethane cellular material prepared from (1) an anhydrous, fluid polyester polyol having a hydroxyl number of from about 350 to 500 and having an average of at least 3 hydroxyl groups per molecule, (2) an isocyanato-terminated polyester polyurethane having an average of at least 3 isocyanato groups per molecule, (3) an arylene diisocyanate, (4) a material selected from the group consisting of a polyhalogenated carbon compound and mixtures thereof, said carbon compound having a molecular weight greater than about 120 and having the formula $(X)_aR(F)_b$ wherein X is a radical selected from the group consisting of chlorine and bromine, $a$ and $b$ are integers at least equal to 1 with the sum of $a$ and $b$ being at least equal to 4; R is a polyvalent organic radical of from 1 to 4 carbon atoms with the valence of R being equal to the sum of $a$ and $b$, and (5) a tertiary amine catalyst; the total number of isocyanato groups in (2) and (3) being about equal to the total number of hydroxyl groups in (1); there being at least 1 cross link for each 600 units of molecular weight of said polyurethane cellular material; there being from about 5 to 25 parts by weight of said polyhalogenated carbon compound for every 100 parts by weight of said polyurethane cellular material, with the proviso that when a single polyhalogenated carbon compound is used its boiling point at atmospheric pressure range from about 0° to about 50° C. and that when a mixture of polyhalogenated carbon compounds be used the boiling point of the mixture at atmospheric pressure range from about 0° to 50° C.; with the further proviso that the polyester polyol have a solubility at 25° C. of less than about 2% by weight in the polyhalogenated carbon compound.

The novel polyester polyurethane cellular materials of the present invention are highly cross-linked with cells which are, for the most part, non-connecting and which cells contain trapped therein a halogenated carbon vapor which has a low thermal conductivity. Consequently these cellular materials are very useful as insulation. As noted from the above definition, these materials are prepared by mixing together a polyester polyol, an isocyanato-terminated polyester polyurethane, an arylene diisocyanate, a polyhalogenated carbon material and a tertiary amine catalyst. In order to obtain a highly useful cellular material, certain limitations apply to some of these reactants as will be more particularly discussed hereinafter. It is to be understood that in preparing these cellular materials certain optional additives such as dispersing agents and cell stabilizers may be used. In general the novel polyurethane cellular materials of the present invention range in density of from 1.2 to about 8.0 pounds per cubic foot.

In preparing these cellular materials the various components are homogeneously dispersed by suitable means and the resulting mixture subsequently expands to yield the desired cellular structure. Generally the various components are mixed at room temperature. However it is to be understood that they may be warmed slightly to obtain a lower viscosity for more convenient handling. The polyhalogenated carbon material is added as a liquid and may be introduced with the other components at any time before heat is evolved from the mixing together of the other components. The heat of reaction liberated by urethane formation from the reaction of the polyester polyol with the isocyanato-terminated polyester polyurethane and the arylene diisocyanate vaporizes the polyhalogenated carbon material and in general, therefore, it is not necessary for external heat to be applied. The polyhalogenated carbon material may be blended with the isocyanato-terminated polyester polyurethane or it may be added when the polyester polyol and the isocyanato-terminated polyester polyurethane are being mixed together.

The mixing of the various components may be done by hand with paddles or by conventional mechanically-driven agitators. In order to insure dispersion of the polyhalogenated carbon material, a slight pressure may be applied at the time the other components are being mixed. As mentioned above, the heat of reaction liberated by the formation of the urethane linkages vaporizes the polyhalogenated carbon material and this acts as the blowing agent in forming the cellular structure. The resulting foam contains a high percentage of closed cells with the polyhalogenated carbon material trapped therein. Since the polyhalogenated carbon material acts as the blowing agent, it is not necessary to use any water during the foaming operation. In fact, since the present invention is directed to a foam having improved insulation efficiency, it is necessary that the closed cells of the polyurethane foam be filled with the polyhalogenated carbon material which has a rather low thermal conductivity rather than with carbon dioxide which is obtained when the foams are blown by the reaction of water with isocyanato groups. Consequently it is necessary that the various components used in the formation of these novel cellular materials be anhydrous.

The polyester polyols which are used in obtaining the novel cellular materials of the present invention should have a hydroxyl number of about 350 to 500 and an acid number as close to 0 as possible. An essential feature of these polyester polyols is that they have a solubility at 25° C. of less than about 2% by weight in the polyhalogenated carbon material used. It has been determined that with a solubility greater than about 2% by weight, the resulting cellular material will not retain improved insulation efficiency properties over a long period of time. This polyester polyol should have an average of at least about 3 hydroxyl groups per molecule and the polyol should be selected so as to provide a degree of cross-linking in the final cellular material of at least about 1 cross-link for each 600 units of molecular weight. The degree of cross-linking and the relative closed-cell content of the resulting cellular material appear to be related since it has been found that as the number of cross links increases the percentage of closed cells also increases. The polyester polyol should be substantially anhydrous, and for ease of operation should be fluid at room temperature. It is to be understood that a solid polyester polyol can be used provided that it melts at or below about 40° C.

The polyesters polyol is prepared by the usual methods of condensation polymerization by reacting a molar excess of an organic polyol with a dibasic carboxylic acid. The reactants are agitated at a temperature between about 150 and 225° C. until the acid number of the mixture decreases to the desired value. A catalyst such as para-toluene sulfonic acid may be used but it is not necessary. When the reaction is completed, the mixture obtained should be heated under reduced pressure to remove any water evolved during the condensation.

The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol components or components of the polyester are preferably trihydric. Examples of suitable polyols include trimethylolethane, trimethylolpropane, mannitol, hexane triol, glycerine, and pentaerythritol. Small amounts of dihydric alcohols such as ethylene glycol, diethylene glycol, 1,2-propylene glycol, 1,4-butanediol, and cyclohexanediol may also be used. In order that the polyurethane foam be sufficiently rigid it is recommended that no more than about 20% of the hydroxyl groups of the polyester used be supplied by a diol.

The isocyanato-terminated polyester polyurethanes should have an average of at least 3 isocyanato groups per molecule and may be prepared by reacting a molar excess of an arylene diisocyanate with the polyester polyol as described above. Representative diisocyanates include compounds such as toluene-2,4-diisocyanate, 1,5-naphthalenediisocyanate, cumene-2,4-diisocyanate, 4-methoxy-1,3-phenylene diisocyanate, 4-chloro-1,3-phenylenediisocyanate, 4-bromo-1,3-phenylenediisocyanate, 4-ethoxy-1,3-phenylenediisocyanate, 2,4′-diisocyanatodiphenylether, 5,6-dimethyl-1,3-phenylenediisocyanate, 2,4-dimethyl-1,3-phenylenediisocyanate, 4,4′-diisocyanatodiphenylether, benzidinediisocyanate, 4,6-dimethyl-1,3-phenylenediisocyanate, 9,10-anthracenediisocyanate, 4,4′-diisocyanatodibenzyl, 3,3-dimethyl-4,4′-diisocyanatodiphenylmethane, 2,6-dimethyl-4,4′-diisocyanatodiphenyl, 2,4-diisocyanatostilbene, 3,3′-dimethyl-4,4′-diisocyanatodiphenyl, 3,3′-dimethoxy-4,4′-diisocyanatodiphenyl, 1,4-anthracenediisocyanate, 2,5-fluorenediisocyanate, 1,8-naphthalenediisocyanate, and 2,6-diisocyanatobenzfuran. It is to be understood that mixtures of two or more different diisocyanates may be employed.

Another component which is used in preparing the novel cellular materials of this invention is an arylene diisocyanate. Any of the diisocyanates described above may be employed. This diisocyanate may be mixed with the isocyanato-terminated polyester polyurethane and the polyester polyol or it may be present in combination with the isocyanato-terminated polyester polyurethane itself. This situation arises when a large molar excess, i.e. an excess greater than 2:1 of arylene diisocyanate is employed in preparing the polyester polyurethane. In preparing the polyester polyurethane in this fashion it is desirable to employ a molar excess of arylene diisocyanate to polyester polyol of from about 5:1 to about 7:1.

The amounts of isocyanato-containing components and hydroxyl-containing components to be used in preparing the cellular materials of this invention should be selected so that the total number of isocyanato groups is about equal to the total number of hydroxyl groups. In addition, the amounts of components to be used should be selected so that the resulting polyurethane cellular materials contain at least about 1 cross link for each 600 units of molecular weight. As mentioned above, the degree of cross-linking appears to be related to the percentage of closed cells and, in order that the cellular materials of this invention have improved insulation efficiency, it is necessary that they contain about 70% closed cells.

The polyhalogenated carbon materials which are used in the formation of the cellular materials of this invention are vaporized due to the heat of reaction of urethane formation and consequently function as the blowing agent. The resulting foam contains these polyhalogenated carbon materials trapped within the closed cells. These materials may be represented by the formula $(X)_aR(F)_b$ wherein X is a radical selected from the group consisting of chlorine and bromine, $a$ and $b$ are integers at least equal to 1 with the sum of $a$ and $b$ being at least equal to 4; R is a polyvalent organic radical of from 1 to 4 carbon atoms with the valence of R being equal to the sum of $a$ and $b$. These materials should have a molecular weight of greater than about 120 and they may be employed in concentrations ranging from about 5 to 25 parts by weight of the polyurethane cellular materials. It is to be understood that mixtures of these materials may also be employed.

When a single polyhalogenated carbon material is used to prepare the cellular material, the boiling point of this should range from about 0 to 50° C. at atmospheric pressure. Those polyhalogenated carbon materials which boil below 0° C. are too volatile for convenient handling during the preparation of the foam. External cooling can be applied but the isocyanate and hydroxyl groups in the composition will then react less readily to chain extend and crosslink the foam. Those polyhalogenated carbon materials which boil above 50° C. at atmospheric pressure provide too little vapor to foam the fluid polyurethane composition without application of external heat. It is to be understood that when mixtures of polyhalogenated carbon materials are used, the boiling points of individual components may range from −30 to 93° C. at one atmosphere pressure provided the initial boiling point of the mixture ranges from about 0 to 50° C. at one atmosphere pressure.

Representative examples of polyhalogenated carbon materials which can be used alone are: trichloromonofluoromethane (B.P. 23.77° C.), trichlorotrifluoroethane (B.P. 47.57), dichlorohexafluoropropane (B.P. 33–35.8), monochloroheptafluorocyclobutane (B.P. 25° C.), dichlorodifluoroethylene (B.P. 20° C.) and 2,3-dichloro-1,1,3,3-tetrafluoropropene-1 (B.P. 47° C.). Trichloromonofluoromethane is preferred. Representative examples of polyhalogenated carbon materials which can be used as part of a mixture initially boiling between about 0 and 50° C. at one atmosphere pressure are: dichlorodifluoromethane (B.P. −29.8° C.), 1,1,2,2-tetrachloro-1,2-difluoroethane (B.P. 92.8° C.) 1,2-dichloro-1,1,2,2-tetrafluoroethane (B.P. 3.55° C.), and 1,2-dichlorohexafluorocyclobutane (B.P. 59.9° C.).

In preparing the novel cellular materials of this invention it is desirable to employ a tertiary amine catalyst. Concentration of the catalyst and its catalytic activity should be balanced so that a sufficient time is provided for mixing of the polyester polyol component with the isocyanato-terminated polyester polyurethane and arylene diisocyanate components. In general from about 0.1 to 2.0 parts by weight of catalyst per 100 parts by weight of polyurethane-forming components is satisfactory. The catalyst is preferably added with the polyester polyol component. Any of the tertiary amine catalysts familiar to one skilled in the art of polyurethane foam technology may be employed. These catalysts include compounds such as N-methyl morpholine, triethylamine, trimethylamine, etc.

Optional additives such as dispersing agents, cell stabilizers and surfactants may be employed in preparing the polyurethane cellular materials of this invention. Thus a finer cell structure may be obtained if water-soluble organo silicone polymers are used as surfactants. These organo silicone polymers should have a molecular weight of about 2500 to 6000 and may be obtained by condensing a polyalkoxy polysilane with the monoether of a polyalkyleneether glycol in the presence of an acid catalyst. Other surfactants such as ethylene oxide modified sorbitan monopalmitate or ethylene oxide modified polypropyleneether glycol may be used, if desired, to obtain better dispersion of the components. Representative surfactants which are water-soluble organo silicone polymers are available commercially as X-520 and X-521 from Union Carbide Corporation.

The cellular materials of the present invention, due to the fact that they have a high closed cell content and the fact that these cells contain a polyhalogenated carbon material which has a low thermal conductivity, are highly useful insulating materials. It is only by following the teachings of this invention that it is possible to obtain a polyurethane cellular material of increased insulation efficiency, which material will retain its insulation efficiency over a long period of time. Particularly these cellular materials provide suitable insulation for low and medium temperature service such as in refrigerators. The cellular material can be applied to a surface by pouring thereon the various foam-forming components and allowing the composition to expand to yield the cellular structure. This provides a convenient way whereby the insulation can be installed in places having irregular shapes.

The improved insulating efficiency of the cellular materials of this invention is attributed to the low thermal conductivity of the material contained within the closed cells. The thermal conductivity of the foams prepared according to the present invention is significantly better than polyurethane foams previously prepared.

The following examples will better illustrate the nature of the present invention; however, the invention is not intended to be limited to these examples. Parts are by weight unless otherwise indicated.

PREPARATION OF POLYESTER POLYOL (A)

A polyester polyol is made by the conventional methods of condensation polymerization by reacting 1998 parts of phthalic anhydride, 1971 parts of adipic acid, 4824 parts of trimethylolpropane and 954 parts of diethylene glycol. It has a hydroxyl number of about 431, an acid number of about 1, and a water content of about 0.04% by weight. Its maximum solubility in trichloromonofluoromethane at 25° C. is about 0.1% by weight.

PREPARATION OF POLYESTER POLYOL (B)

A polyester polyol is made by the conventional methods of condensation polymerization by reacting 406 parts of phthalic anhydride, 1790 parts of adipic acid and 3280 parts of trimethylolpropane. It has a hydroxyl number of about 414, an acid number of about 2, and a water content of about 0.1% by weight.

PREPARATION OF THE ISOCYANATO-TERMINATED POLYESTER POLYURETHANE COMPOSITION (A)

2000 parts of polyester polyol (A) and 8000 parts of a toluenediisocyanate isomer mixture (80% 2,4-, 20% 2,6-) are agitated in a dry reaction vessel (protected from atmospheric water vapor by a slow sweep with dry nitrogen) for 1 hour at 100° C. The composition has a free NCO content of about 31.8% and a Brookfield viscosity of 750 cps. at 25° C.

PREPARATION OF THE ISOCYANATO-TERMINATED POLYESTER POLYURETHANE COMPOSITION (B)

4400 parts of polyester polyol (B) and 15,600 parts of a toluene diisocyanate isomer mixture (80% 2, 4-, 20% 2,6-) are mixed together at room temperature in a dry reaction vessel protected from atmospheric moisture. Heat is evolved and the temperature of the mixture rises to about 47.6°. External heat is then applied to the mixture and the temperature is adjusted to 80° C. The reactants are agitated for 1 hour at 80° C. The isocyanato-terminated polyester polyurethane composition obtained has a Brookfield viscosity of 2,800 cps. at 45° C. and a free isocyanato content of 29.6%.

*Example 1*

(A) 98 parts of polyester polyol (A) is mixed at room temperature with 0.5 part of triethylamine and 0.3 part of a surfactant which is a water-soluble organo silicone polymer (commercially available as X-521 from Union Carbide Corporation). A second mixture is prepared at room temperature using 100 parts of the isocyanato-terminated polyester polyurethane composition (A), 0.2 part of a surfactant which is a water-soluble organo silicone polymer (commercially available as X-521 from Union Carbide Corporation) and 25 parts trichloromonofluoromethane. The two mixtures are stirred together vigorously for 20 seconds and the foamable composition that results is poured into a mold lined with a high melting wax. The foamable composition expands to fill the mold in 1½ minutes. The rigid foam (1-A) obtained is stripped from the mold and cured for 1 hour at 100° C. Its properties are given in Table I.

(B) The procedure of part A above is repeated except that 35 parts of trichloromonofluoromethane are employed. The properties of the cured foam (1-B) are given in Table I.

(C) The procedure of part A above is repeated except that 45 parts of trichloromonofluoromethane are employed. The properties of the cured foam (1-C) obtained are given below in Table I.

(D) 60 parts of polyester polyol (A) is mixed at room temperature with 2.8 parts of water, 0.5 part of triethylamine, and 0.3 part of a surfactant which is a water soluble organo silicone polymer (commercially available as X-521 from Union Carbide Corporation). A second mixture is prepared at room temperature using 100 parts of the isocyanato-terminated polyester polyurethane (A)

and 0.2 part of a surfactant which is a water-soluble organo silicone polymer (commercially available as X-521 from Union Carbide Corporation). The two mixtures are stirred together vigorously for about 20 seconds. The foamable composition which results is poured into a wax-lined mold where it expands to give a fine celled rigid foam (1-D). After the foam has been stripped from the mold it is heated for 1 hour at 100° C. The properties of this foam are given in Table I.

(E) The foams prepared in parts A, B and C above are stored at 50° C. in an air oven. The thermal conductivity of these foams is measured after heat aging. The data obtained, which is given in Table I below, indicates the thermal conductivity of these foams after this aging period.

TABLE I.—FOAM PROPERTIES

| Foam | 1-D | 1-A | 1-B | 1-C |
| --- | --- | --- | --- | --- |
| Percent Halogenated carbon material | 0 | 13 | 18 | 23 |
| Density (lbs./cu. ft.) | 1.99 | 2.04 | 1.86 | 1.66 |
| Percent Closed Cells | 99 | 87 | 88 | 87 |
| Tensile Strength (lbs./sq. in.) | 81 | 73 | 44 | 46 |
| k-factor at 50° C.: | | | | |
| $t=0$ | 0.233 | 0.164 | 0.162 | 0.152 |
| $t=1$ week | | 0.169 | 0.172 | 0.181 |
| $t=3$ weeks | | 0.169 | 0.175 | 0.183 |
| $t=8$ weeks | | 0.177 | 0.181 | 0.194 |
| $t=12$ weeks | | 0.175 | 0.175 | 0.191 |
| $t=18$ weeks | | 0.178 | 0.183 | 0.194 |

*Example 2*

(A) 95 parts of polyester polyol (B) is mixed at room temperature with 0.5 part of triethylamine and 0.3 part of a surfactant which is a water-soluble organo silicone polymer (commercially available as X-521 from Union Carbide Corporation). Similarly, 100 parts of the isocyanato-terminated polyester polyurethane composition (B), 25 parts of trichloromonofluoromethane and 0.2 part of the surfactant which is a water-soluble organo silicone polymer (commercially available as X-521 from Union Carbide Corporation) are agitated together at room temperature. The two mixtures thus prepared are then added together and steadily stirred for about 40 seconds. The foamable composition obtained is poured into a mold lined with a high melting wax. There it expands for 2½ minutes to give a rigid foam whose properties are shown below in Table II.

(B) The procedure of part A above is repeated except that 35 parts of trichloromonofluoromethane is employed in place of 25 parts. The properties of the foam obtained are given below in Table II.

(C) The procedure of part A above is repeated except that 45 parts of trichloromonofluoromethane is employed in place of 25 parts. The properties of the foam obtained are given below in Table II.

(D) 1 part of polyoxyethylated sorbitan monopalmitate, 0.3 part of dimethylethanolamine, 3 parts of water, and 60 parts of polyester polyol (B) are mixed together at room temperature. This mixture is stirred at room temperature with 100 parts of the isocyanato-terminated polyester polyurethane composition (B) for about 20 seconds. The foamable composition which results is poured into a wax-lined mold where it expands to give a fine celled rigid foam. After the foam has been stripped from the mold it is heated for 1 hour at 100° C. The properties of this foam are given in Table II.

(E) The foams prepared in parts A, B and C above are aged in an air oven at 50° C. for intervals of time ranging up to 18 weeks. The thermal conductivity of the foams is measured at regular intervals during this time. Table II, which shows the data obtained, indicates the thermal conductivity of these foams after the aging period.

TABLE II.—FOAM PROPERTIES

| Foam | 2-D | 2-A | 2-B | 2-C |
| --- | --- | --- | --- | --- |
| Percent halogenated carbon material | 0 | 13 | 18 | 23 |
| Density (lbs./cu. ft.) | 1.98 | 3.14 | 2.67 | 2.40 |
| Percent Closed Cells | 89 | 91 | 94 | 91 |
| Yield Point (p.s.i.) | 38 | 75 | 66 | 54 |
| k-factor: | | | | |
| $t=0$ | 0.245 | 0.131 | 0.129 | 0.133 |
| $t=1$ week | | 0.131 | 0.153 | 0.160 |
| $t=3$ weeks | | 0.151 | 0.160 | 0.166 |
| $t=8$ weeks | | 0.162 | 0.160 | 0.174 |
| $t=12$ weeks | | 0.163 | 0.162 | |
| $t=18$ weeks | | 0.168 | 0.166 | |

*Example 3*

(A) 97 parts of polyester polyol (A), 0.3 part of triethylamine and 0.25 part of a surfactant which is a water-soluble organo silicone polymer (commercially available as X-520 from Union Carbide Corporation) are mixed together at room temperature. Then 100 parts of the isocyanato-terminated polyester polyurethane composition (A), 20 parts of trichloromonofluoromethane and 0.25 part of the surfactant which is a water-soluble organo silicone polymer (commercially available as X-520 from Union Carbide Corporation) are agitated together at room temperature. The two mixtures are added together and stirred at room temperature for 20 seconds. The foamable composition obtained is then poured into a wax-lined mold which is subsequently filled by expansion in 1½ minutes. The properties of the rigid foam obtained are given in Table III below.

(B) The procedure of part A above is repeated except that 30 parts of trichloromonofluoromethane are employed instead of 20 parts. The properties of the rigid foam obtained are given below in Table III.

TABLE III.—FOAM PROPERTIES

| Foam | 3-A | 3-B |
| --- | --- | --- |
| Percent halogenated carbon material | 11 | 17 |
| Density (lbs./cu. ft.) | 3.43 | 2.12 |
| Percent Closed Cells | 94 | 91 |
| Yield Point (lbs./sq. in.) | 82 | 41 |

*Example 4*

(A) 13.5 parts of 1,4-butanediol, 60 parts of polyester polyol (A), 0.5 part of triethylamine, and 0.5 part of a surfactant which is a water-soluble organo silicone polymer (commercially available as X-520 from Union Carbide Corporation) are agitated together. A second mixture is prepared by stirring together 100 parts of the isocyanato-terminated polyester polyurethane composition (A) and 20 parts of trichloromonofluoromethane. The two mixtures thus obtained are added together, strongly agitated for about 30 seconds, and poured into a mold lined with a high melting wax. The foamable composition expands to fill the mold with a fine celled rigid foam having a density of 2.12 lb./cu. ft. The yield point is 39 lb./sq. in.

(B) 0.5 part of triethylamine, 97 parts of polyester polyol (A) and 0.5 part of a surfactant which is a water-soluble organo silicone polymer (commercially available as X-520 from Union Carbide Corporation) are mixed together at room temperature. A second mixture is prepared by stirring together 30 parts of trichloromonofluoromethane and 100 parts of the isocyanato-terminated polyester polyurethane composition (A). The two mixtures obtained are added together and agitated strongly for 30 seconds. The foamable composition obtained is poured into a mold lined with a high melting wax where it expands to give a foam having a density of about 3.43 lb./cu. ft. and a yield point of about 76 lb./sq. in.

*Example 5*

(A) To 98 parts of polyester polyol (A) is added with stirring, 0.5 part of triethylamine, 25 parts of trichlorotrifluoroethane and 0.3 part of a surfactant which is a water-soluble organo silicone polymer (commercially available as X–521 from Union Carbide Corporation). This mixture is introduced into 100 parts of the isocyanato-terminated polyester polyurethane composition (A) containing 0.2 part of a surfactant which is a water-soluble organo silicone polymer (commercially available as X–520 from Union Carbide Corporation). The mass is stirred vigorously for 30 seconds and poured into a wax-lined mold. Foaming is allowed to proceed in a 70° C. oven. The foam fills the mold to give a rigid tack-free foam having a fine cell structure. Its properties are given in Table V below.

(B) The procedure of part A above is repeated except that 35 parts of trichlorotrifluorothane is used instead of 25 parts. The properties of the foam obtained are given in Table IV below.

TABLE IV.—FOAM PROPERTIES

| Foam | 5-A | 5-B |
| --- | --- | --- |
| Percent halogenated carbon material | 12.8 | 17.8 |
| Density (lbs./cu. ft.) | 3.51 | 3.05 |
| Percent Closed Cell | 94 | 89 |
| Yield Point (lbs./sq. in.) | 76 | 72 |
| k-factor | 0.143 | 0.134 |

*Example 6*

The procedure of part A of Example 1 is repeated except that no surfactant is used and 97 parts of polyester polyol (A) is employed instead of 98 parts. The rigid foam obtained displays the following properties: density 2.2 lbs./cu./ft.; yield point 24 lbs./sq. in.; closed cell content 85%; k-factor 0.185.

As many widely different embodiments of this invention may be made without departing from the spirit and scope thereof, it is to be understood that this invention is not limited to the specific embodiments thereof except as defined in the appended claim.

What is claimed is:

A polyester polyurethane cellular material prepared from (1) an anhydrous, fluid polyester polyol having a hydroxyl number of from about 350 to 500 and having an average of at least 3 hydroxyl groups per molecule, said polyester polyol being prepared from a composition selected from a group consisting of (a) a composition comprising phthalic anhydride, adipic acid, trimethylolpropane and diethylene glycol and (b) a composition comprising phthalic anhydride, adipic acid and trimethylolpropane, (2) an isocyanato-terminated polyester polyurethane having an average of at least 3 isocyanato groups per molecule and prepared by reacting a molar excess of an arylene diisocyanate with a polyester polyol of the type described in (1) above, (3) an arylene diisocyanate, (4) trichloromonofluoromethane and (5) a tertiary amine catalyst; the total number of isocyanato groups in (2) and (3) being about equal to the total number of hydroxyl groups in (1); there being from about 5 to 25 parts by weight of said trichloromonofluoromethane for every 100 parts by weight of said polyurethane cellular material.

References Cited in the file of this patent
UNITED STATES PATENTS

| | | |
| --- | --- | --- |
| 2,848,428 | Rubens | Aug. 19, 1958 |
| 2,932,621 | Terry | Apr. 12, 1960 |
| 2,957,832 | Gmitter et al. | Oct. 25, 1960 |
| 2,962,183 | Rill et al. | Nov. 29, 1960 |

FOREIGN PATENTS

| | | |
| --- | --- | --- |
| 1,161,239 | France | Mar. 17, 1958 |
| 860,109 | Germany | Dec. 18, 1952 |

OTHER REFERENCES

Barringer: "Rigid Urethane Foams–11 Chemistry and Formulation," Dupont Elastomers Chemicals Dept. Bulletin H.R.–26, April 1958, pages 26 and 27.

Dedication 3,080,329.—*Charles Minor Barringer*, Kennett Township, Chester County, Pa.
POLYURETHANE CELLULAR MATERIALS. Patent dated Mar. 5, 1963.
Dedication filed May 11, 1964, by the assignee, *E. I. du Pont de Nemours and Company*.

Hereby dedicates to the public the entire term of said patent.
[*Official Gazette August 4, 1964.*]

Notice of Adverse Decision in Interference

In Interference No. 95,290 involving Patent No. 3,080,329, C. M. Barringer, POLYURETHANE CELLULAR MATERIALS, final judgment adverse to the patentee was rendered Feb. 17, 1969, as to claim 1.

[*Official Gazette August 5, 1969.*]